(12) United States Patent
Komatsu et al.

(10) Patent No.: US 6,751,541 B2
(45) Date of Patent: Jun. 15, 2004

(54) METHOD AND APPARATUS FOR TRANSMITTING MACHINE OPERATION DATA

(75) Inventors: Hideki Komatsu, Kitasoma-gun (JP); Hiroyuki Adachi, Tsuchiura (JP); Hiroshi Watanabe, Ushiku (JP); Koichi Shibata, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/239,150

(22) PCT Filed: Mar. 21, 2001

(86) PCT No.: PCT/JP01/02229
§ 371 (c)(1), (2), (4) Date: Sep. 20, 2002

(87) PCT Pub. No.: WO01/71109
PCT Pub. Date: Sep. 27, 2001

(65) Prior Publication Data
US 2003/0037466 A1 Feb. 27, 2003

(30) Foreign Application Priority Data
Mar. 23, 2000 (JP) ........................................ 2000-082169

(51) Int. Cl.[7] ................................................. G06F 7/00
(52) U.S. Cl. ...................................................... 701/50
(58) Field of Search ..................................... 701/50, 35

(56) References Cited

U.S. PATENT DOCUMENTS 4,853,859 A * 8/1989 Morita et al. ................. 701/35
6,204,772 B1 * 3/2001 DeMay et al. ............ 340/686.1

FOREIGN PATENT DOCUMENTS

| JP | 07-273714 | 10/1995 | | |
|---|---|---|---|---|
| JP | 09-256417 | 9/1997 | | |
| JP | 10183691 A | * 7/1998 | ............. | E02F/9/20 |
| JP | 10-336761 | 12/1998 | | |
| JP | 3011256 | 2/2000 | | |
| WO | 95/28524 | 10/1995 | | |

* cited by examiner

Primary Examiner—Yonel Beaulieu
(74) Attorney, Agent, or Firm—Crowell & Moring LLP

(57) ABSTRACT

To permit grasping operation conditions of a working machine at a control station located at a remote place no matter whether or not a trouble has occurred on the working machine, a CPU of a controller arranged on a hydraulic excavator produces operation data in accordance with signals outputted from operation detecting unit such as various sensors. These operation data are stored in a memory unit on the basis of time outputted from a clock unit, for example, depending upon the day. The operation data stored depending upon the day are outputted from an output unit of the controller to satellite communication terminal equipment, for example, when a key switch has been turned on. The operation data are transmitted from the satellite communication terminal equipment to an earth station via a communication satellite and further, are automatically transmitted from the earth station to a control station via a telephone line such that the operation data can be obtained as daily report data or the like by operating a PC at the control center.

12 Claims, 8 Drawing Sheets

FIG. 6

| DETECTION SIGNAL | DETERMINATION STANDARD | OPERATION DATA |
|---|---|---|
| KEY SWITCH SIGNAL | OFF → ON | KEY SWITCH ON |
| KEY SWITCH SIGNAL | ON → OFF | KEY SWITCH OFF |
| REGULATOR DRIVE SIGNAL | OFF → ON | ENGINE STARTED |
| ENGINE SPEED SIGNAL | WHEN CHANGED TO PREDETERMINED ENGINE SPEED OR HIGHER | ENGINE STARTED |
| REGULATOR DRIVE SIGNAL | ON → OFF | ENGINE STOPPED |
| ENGINE SPEED SIGNAL | WHEN CHANGED TO A SPEED LOWER THAN PREDETERMINED ENGINE SPEED | ENGINE STOPPED |
| PUMP PRESSURE SIGNAL | WHEN CHANGED TO PREDETERMINED PRESSURE OR HIGHER | OPERATED |
| PUMP PRESSURE SIGNAL | WHEN CHANGED TO A PRESSURE LOWER THAN PREDETERMINED PRESSURE | NOT OPERATED |
| PILOT PRESSURE SIGNAL | WHEN CHANGED TO PREDETERMINED PRESSURE OR HIGHER | OPERATED |
| PILOT PRESSURE SIGNAL | WHEN CHANGED TO A PRESSURE LOWER THAN PREDETERMINED PRESSURE | NOT OPERATED |
| WORKING OIL TEMPERATURE SIGNAL | WHEN CHANGED TO PREDETERMINED TEMPERATURE OR HIGHER | OIL TEMPERATURE ARISEN |
| WORKING OIL TEMPERATURE SIGNAL | WHEN CHANGED TO A TEMPERATURE LOWER THAN PREDETERMINED TEMPERATURE | OIL TEMPERATURE DROPPED |

METHOD AND APPARATUS FOR TRANSMITTING MACHINE OPERATION DATA

TECHNICAL FIELD

This invention relates to a method and system for transmitting operation data of a working machine such as a hydraulic excavator, which automatically transmit the operation data of the working machine to a control station located at a remote plate.

BACKGROUND ART

As a conventional technique of this sort, there is, for example, the working machine maintenance system disclosed in JP-A-07166582. According to this conventional technique, when a communication is made from an operator of a working machine to a control center, in other words, a control station located at a remote place to the effect that a trouble has occurred on the working machine, data stored in a controller of the working machine can be automatically transmitted to the control station via communication means such as radio communication equipment or a telephone line in accordance with an instruction given by remote control from the control station.

As another conventional technique, there is, for example, the machine abnormality supervising system and method disclosed in JP-A-11065645. According to this conventional technique, when an abnormality is detected during operation of a machine such as a construction machine, data of the abnormality are automatically transmitted from the machine to a supervising station, in other words, a control station at a remote place via a communication network.

The above-mentioned conventional techniques each automatically transmits data on abnormality to a control station located at a remote place only when the abnormality has occurred on a working machine such as a construction machine. These conventional techniques, therefore, cannot grasp operation conditions of a working machine or the like, which has not developed abnormality yet, at a control station located at a remote place although they are effective for repair work of the working machine which has developed abnormality.

If operation conditions of a working machine such as a hydraulic excavator which is performing digging work, for example, in a mountainous area can be grasped at a control station located at a remote place, it would be possible to determine a desired maintenance schedule and further, to determine suitable replacement parts to be needed upon maintenance and to collect such parts ready for use. It would, therefore, be possible to readily achieve high-accuracy maintenance management on the working machine. If operation data can be analyzed as needed, development of a working machine the performance of which is still better would be expected.

With the foregoing current circumstances in the conventional art in view, the present invention has as an object thereof the provision of a method and system for transmitting operation data of a working machine, which make it possible to grasp operation conditions of the working machine at a control station located at a remote place no matter whether or not abnormality has occurred on the working machine.

DISCLOSURE OF THE INVENTION

To achieve the above-described object, the present invention provides a method for automatically transmitting operation data of a working machine from a controller, which is arranged on the working machine and has produced the operation data, to a control station located at a remote place via predetermined communication means, which comprises storing the operation data at intervals of a predetermined time in the controller, and automatically transmitting at least a group of operation data out of the operation data, said group of operation data having been stored during desired one or more of the intervals, at a predetermined time point from the controller to the control station.

The present invention also provides a method for automatically transmitting operation data of plural working machines from controllers, which are arranged on the working machines, respectively, and have produced the operation data of the corresponding working machines, to a control station located at a remote place via predetermined communication means, which comprises storing the operation data of the respective working machines at intervals of a predetermined time in their corresponding controllers, and automatically transmitting groups of operation data out of the operation data, said groups of operation data having been stored during desired ones or more of the intervals, from the controllers to the control station at predetermined time points shifted from one another.

When constructed as described above, operation data occurred upon operation of the working machine such as a hydraulic excavator are stored in the controller of the working machine at intervals of a predetermined time, for example, 24 hours. The operation data stored as described above during desired one or more of the intervals are automatically transmitted from the controller to the control station located at the remote place via the predetermined communication means at the predetermined time point, for example, when a key switch for starting the working machine is turned on or at a time designated beforehand. Accordingly, the working conditions of the working machine can be precisely grasped at the control station located at the remote place no matter whether or not abnormality has occurred on the working machine. Upon automatically transmitting the operation data, it is possible to set different transmitting times for the individual working machines so that the operation data can be transmitted from the individual working machines to the control station without overlapping.

The above-mentioned predetermined time may be set, for example, at 24 hours as mentioned above, in other words, at 1 day, and the operation data of a preceding day may be transmitted at a predetermined time point.

In this case, the operation data of the preceding day may be transmitted only when the working machine was operated on the preceding day. This makes it possible to reduce the number of transmissions.

When the predetermined time point is set at a time designated beforehand, the time can be set at 0:00 a.m. When the above-described time points are set with respect to plural working machines, these time points may be preferably set such that operation data are transmitted from different working machines at predetermined intervals, for example, at one-minute intervals.

To achieve the above-described object, the present invention also provides a system for transmitting operation data of a working machine, said system being provided with operation detecting means for detecting operating conditions of the working machine, a controller for producing, as operation data, data detected by the operation detecting means, said operation detecting means and said controller being arranged on the working machine, and a control station located at a remote place, connected with the controller via predetermined communication means and adapted to receive operation data outputted from the controller, wherein the controller comprises a clock unit, a memory unit for storing the produced operation data at predetermined time intervals on a basis of a time clocked at the clock unit and an output unit for outputting at least a group of operation data out of the operation data, said group of operation data having been stored in the memory unit during desired one or more of the intervals, at a predetermined time point, and automatically transmits to the control station the operation data outputted from the output unit of the controller.

When constructed as described above, operation data occurred upon operation of the working machine such as a hydraulic excavator are stored in the memory unit of the controller at intervals of a predetermined time, for example, 24 hours, on the basis of a time clocked at the clock unit. The operation data stored in the memory unit during desired one or more of the intervals are automatically transmitted from the output unit of the controller to the control station located at the remote place via the predetermined communication means at the predetermined time point such as a time stored in the memory unit. Accordingly, the working conditions of the working machine can be precisely grasped at the control station located at the remote place no matter whether or not abnormality has occurred on the working machine.

In the above-described construction, the system may further comprise rewriting means capable of rewriting the time stored in the memory unit of the controller.

The predetermined communication means may comprise satellite communication terminal equipment arranged on the working machine and adapted to receive the operation data outputted from the output unit of the controller, a communication satellite for receiving the operation data outputted from the satellite communication terminal equipment, and an earth station for receiving the operation data outputted from the communication satellite and outputting the operation data to the control station.

The predetermined communication means may comprise a telephone line. In this case, the predetermined communication means may further comprise a cellular telephone.

The predetermined communication means may comprise radio-communication equipment.

BRIEF DESCRIPTION OF THE DRAWINGS

FIG. 6 is a table showing a procedure for producing and processing operation data in one embodiment of the method according to the present invention for transmitting the operation data of the working machine;

BEST MODES FOR CARRYING OUT THE INVENTION

The embodiments of the method and system according to the present invention for transmitting the operation data of the working machine will hereinafter be described based on the drawings.

Figure 1:
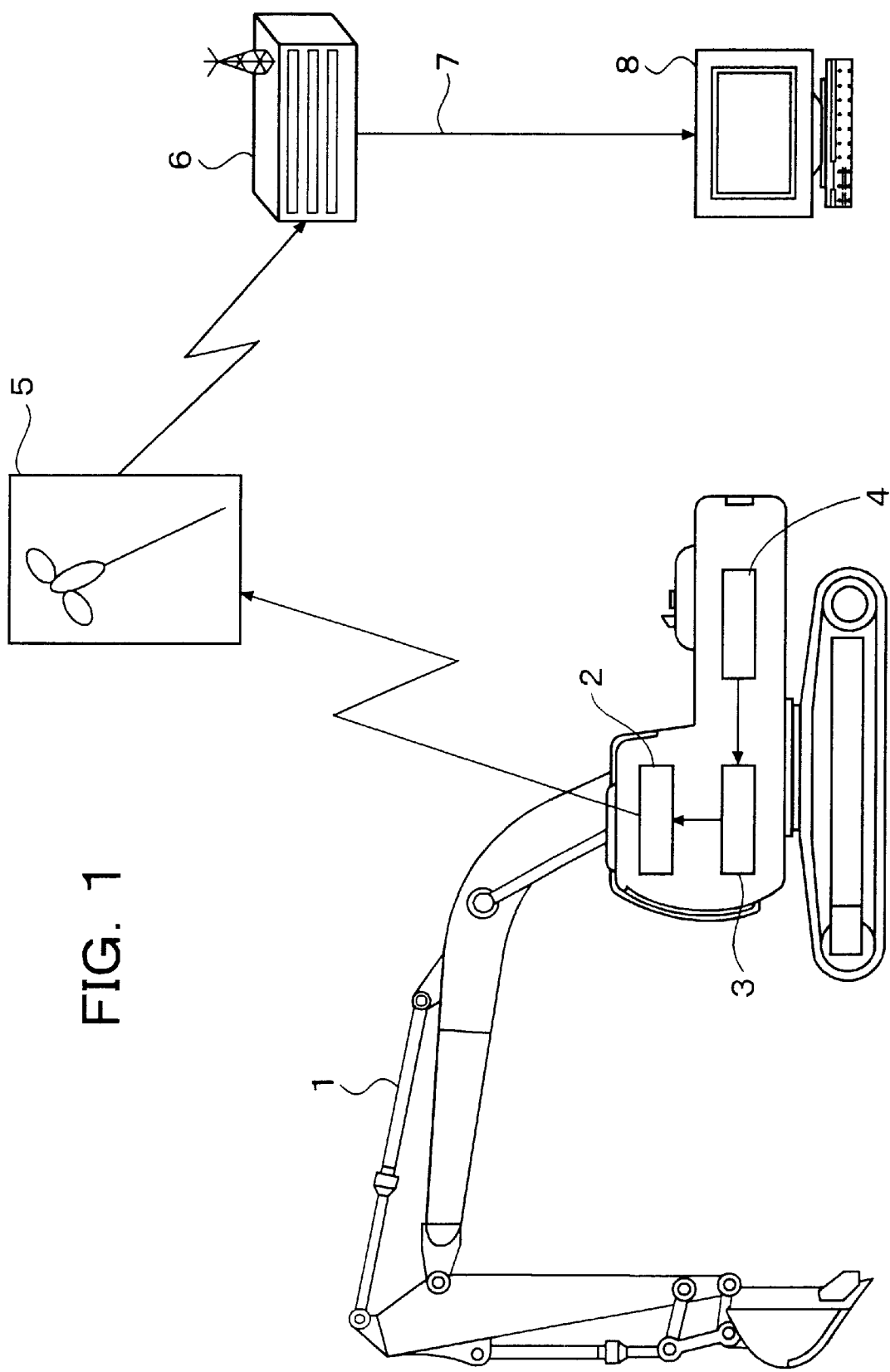
FIG. 1 is a schematic diagram illustrating the overall construction of one embodiment of a system for performing a method according to the present invention for transmitting operation data of a working machine.
Figure 2:
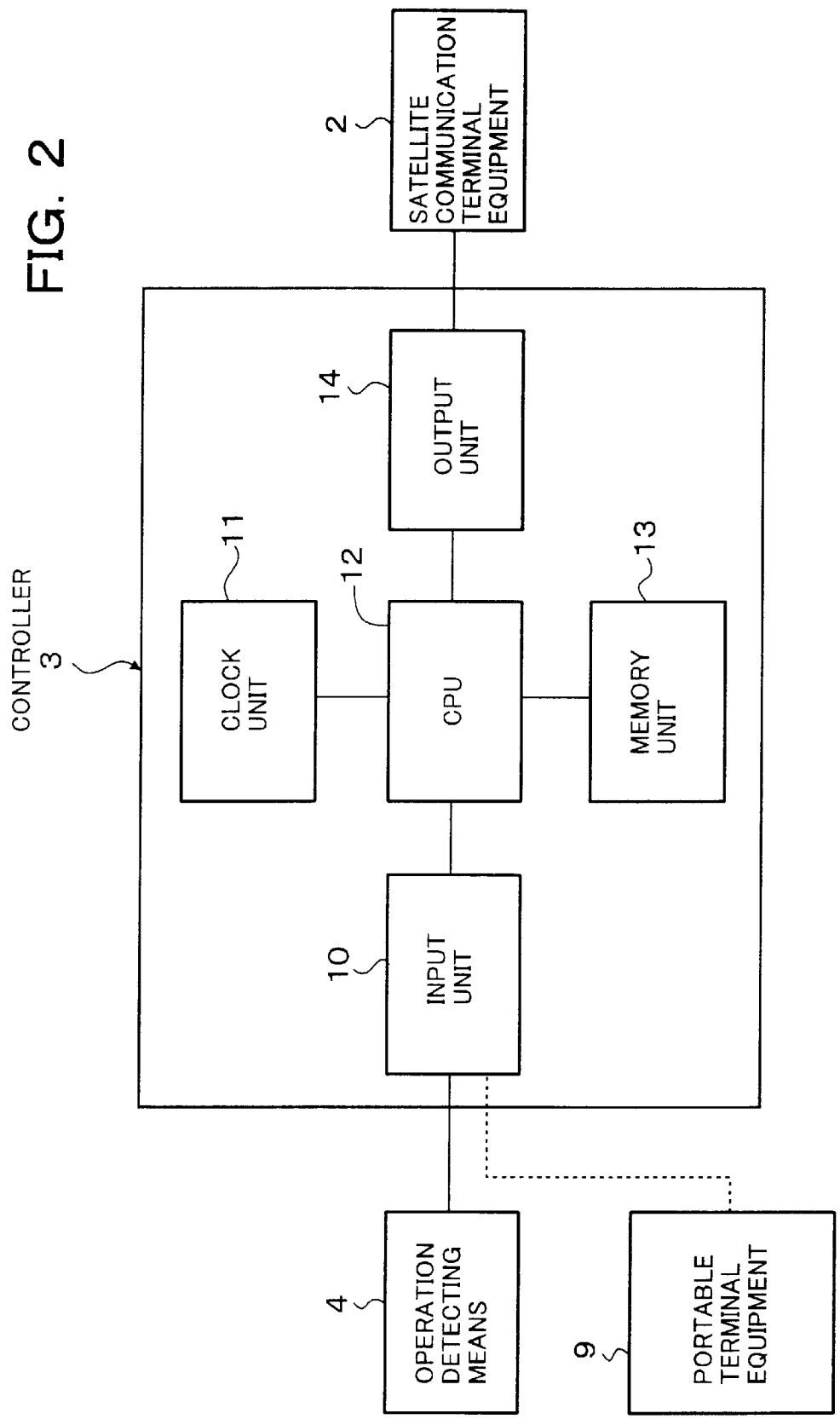
FIG. 2 is a block diagram showing the construction of an essential part of an embodiment of an operation data transmitter of the working machine depicted in FIG. 1.

FIGS. 1 and 2 are the diagrams illustrating the construction of the one embodiment of the system for performing the method according to the present invention for transmitting the operation data of the working machine, in which FIG. 1 is the schematic diagram illustrating the overall construction and FIG. 2 is the block diagram showing the construction of the essential part of the construction.

Based on these FIGS. 1 and 2, a description will firstly be made about the one embodiment of the system according to the present invention for transmitting the operation data of the working machine.

The working machine depicted in FIG. 1, for example, a hydraulic excavator 1 is equipped with an operation detecting means 4 for detecting an operation state of the hydraulic excavator 1. This operation detecting means 4 comprises inter alia a key switch for detecting, for example, whether or not a key for starting the hydraulic excavator 1 has been inserted into a keyhole, and outputting a key switch signal; a regulator drive detector for detecting whether or not a regulator for controlling a delivery rate of a variable displacement hydraulic pump as a main hydraulic pump, and outputting a regulator drive signal; an engine speed sensor for detecting an actual speed of an engine, which operates the above-mentioned hydraulic pump, and outputting an engine speed signal; a delivery pressure sensor for detecting a delivery pressure of the above-mentioned hydraulic pump and outputting a pump pressure signal; a pilot pressure sensor for detecting a pilot pressure adapted to change over a directional control valve included in a hydraulic circuit, which the hydraulic excavator 1 is equipped with, and outputting a pilot pressure signal; and an oil temperature sensor for detecting a temperature of working oil flowing through the hydraulic circuit, which the hydraulic excavator 1 is equipped with, and outputting a working oil temperature signal.

As is illustrated in FIG. 1, the working machine is also equipped with a controller 3 for producing predetermined operation data in response to data detected by the operation detecting means 4 composed of the above-mentioned individual detectors and sensors, in other words, the individual signals outputted from the operation detecting means 4.

This controller 3, as shown in FIG. 2, includes an input unit 10 for receiving individual signals outputted from the operation detecting means 4; a clock unit 11; a memory unit 13 composed of a non-volatile memory such as EEPROM or a flash memory; a central processing unit, namely, CPU 12 having logical decision and operation functions and adapted to perform processing for the production and transmission of operation data; and an output unit 14 for outputting, in accordance with a transmission command from CPU 12, operation data produced by CPU 12.

The operation data produced by CPU 12 are stored in the memory unit 13 at intervals of a predetermined time on the basis of the time clocked at the clock unit 11. Further, operation data stored in the memory unit 13 are outputted from the output unit 14 at a predetermined time point, for example, when the key for starting the hydraulic excavator 1 has been inserted and the key switch has been turned on or at a time stored beforehand in the memory unit 13.

As shown in FIG. 1, the hydraulic excavator 1 is also equipped with satellite communication terminal equipment 2 for receiving operation data signals outputted from the output unit 14 of the controller 3. The operation data signals outputted from the satellite transmission terminal equipment 2 are transmitted to a communication satellite 5, and are then transmitted from the communication satellite 5 to an earth station 6. This earth station 6 and a supervising station 8, which performs remote supervision of the above-mentioned operation state of the hydraulic excavator 1, are connected with each other via a communication line, for example, a telephone line 7. The above-mentioned operation data of the hydraulic excavator 1, said operation data having been processed into an electronic mail format or the like at the earth station 6, are transmitted to the control station 8 via the telephone line 7, and can be obtained at any time by a personal computer which the control station 8 is equipped with.

By the satellite communication terminal equipment 2 which the hydraulic excavator 1 is equipped with, the communication satellite 5, the earth station 6 and the communication line, for example, the telephone line 7, the predetermined communication means is constructed to automatically transmit the operation data of the hydraulic excavator 1, said operation data having been produced at the controller 3 of the hydraulic excavator 1, to the control station 8 located at the remote place.

A cellular telephone or radio communication equipment may be included in the above-mentioned communication means. When it is desired, for example, to store the above-mentioned time, which corresponds to the predetermined time point at which the operation date are to be outputted, in the memory unit 13, the system may further comprise rewriting means for rewriting this time into another time. As illustrated in FIG. 2, such rewriting means can be constructed by portable terminal equipment 9, which has functions as a personal computer and can be detachably connected to the controller 3 which the hydraulic excavator 1 is equipped with.

Based on FIGS. 3 to 6, a description will next be made about the one embodiment of the operation data transmitting method which can be performed by using the above-mentioned one embodiment of the operation data transmitting system.

Figure 3:
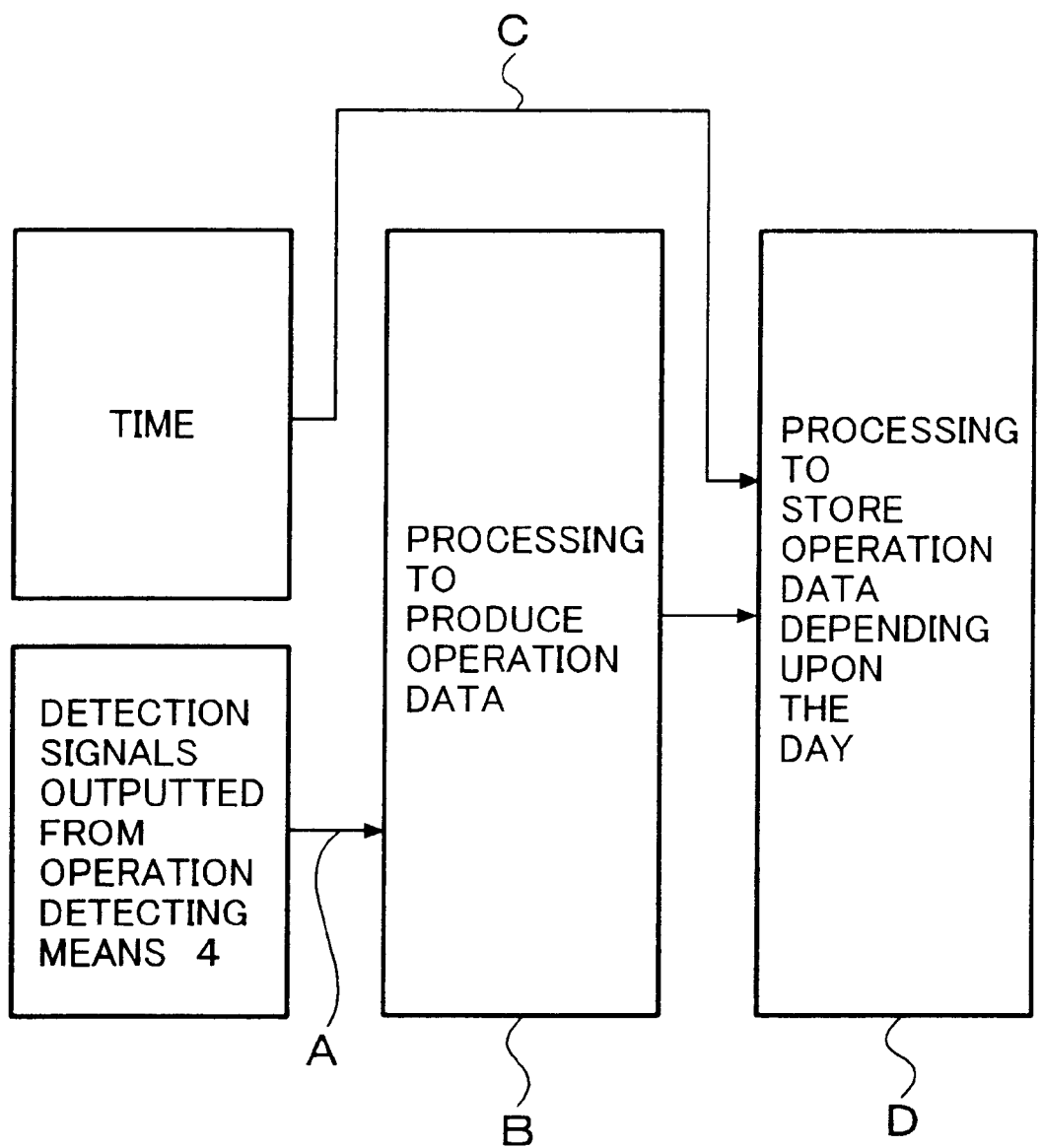
FIG. 3 is a flow diagram showing the procedure of an essential part of an embodiment of an operation data transmitting method to be performed by using the embodiment of the operation data transmitter of the working machine depicted in FIG. 1.
Figure 4:
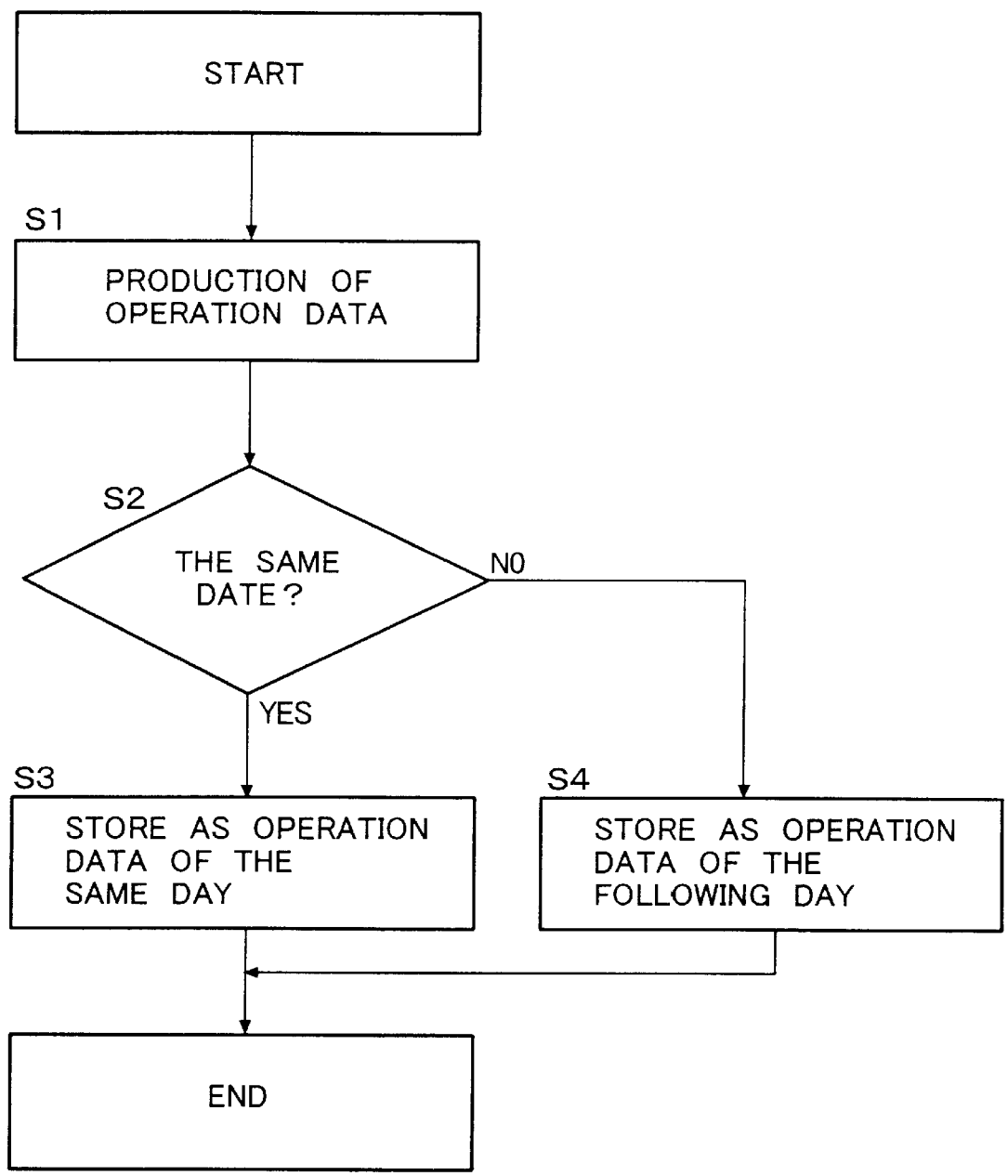
FIG. 4 is a flow chart, which shows a procedure for storing and processing operation data and corresponds to the flow diagram shown in FIG. 3.
Figure 5:
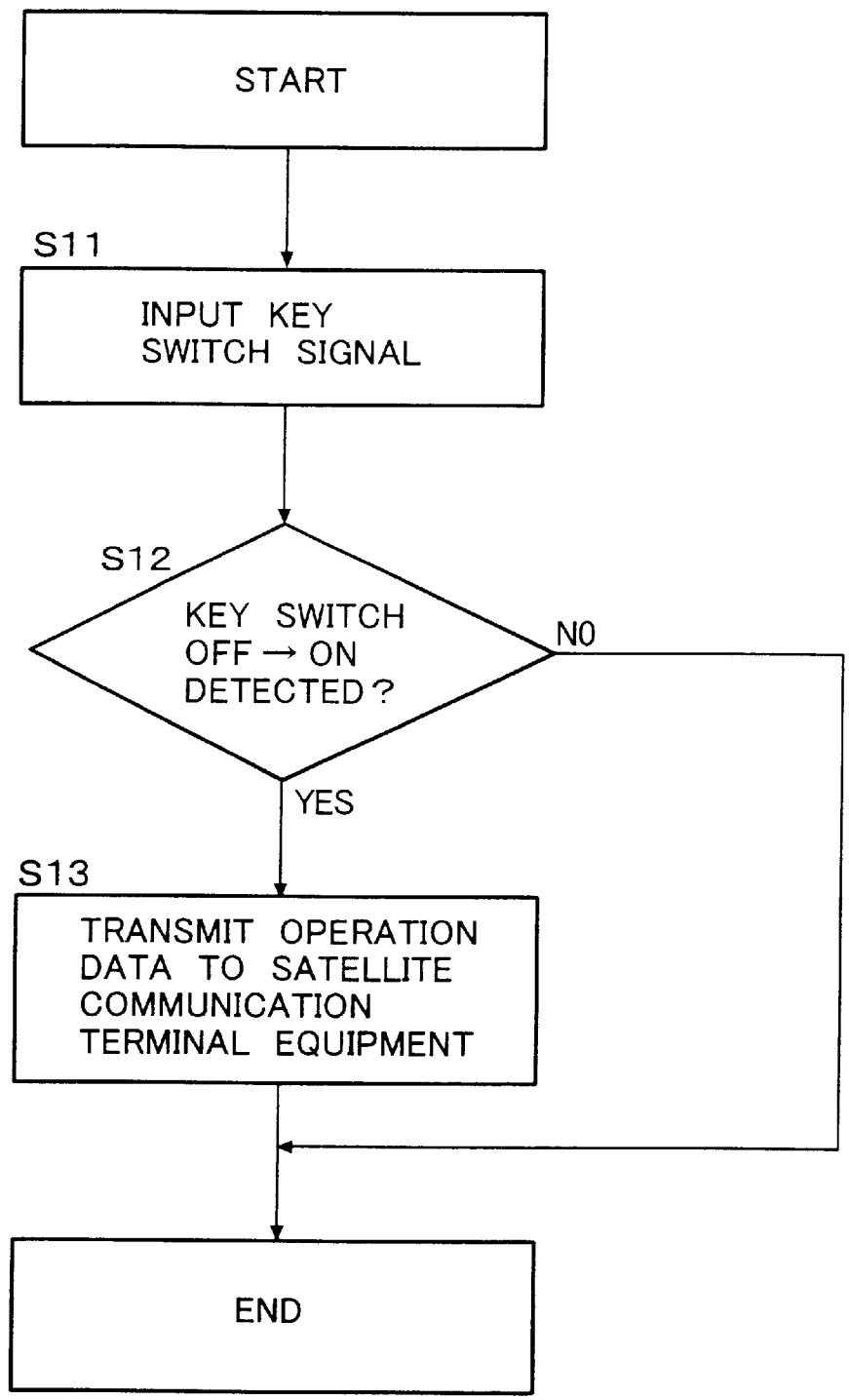
FIG. 5 is a flow chart showing a procedure for transmitting and processing the operation data, said transmission and processing being to be performed subsequent to the processing of the flow chart depicted in FIG. 4.

FIG. 3 is the flow diagram showing the procedure of the essential part of the embodiment of the operation data transmitting method; FIG. 4 is the flow chart, which shows the procedure for processing the operation data and corresponds to the flow diagram shown in FIG. 3; FIG. 5 is the flow chart showing the procedure for transmitting and processing the operation data, said transmission and processing being to be performed subsequent to the processing of the flow chart depicted in FIG. 4; and FIG. 6 is the table showing the procedure for producing and processing operation data, said procedure being to be performed at CPU 12 of the controller 3.

In this one embodiment of the operation data transmitting method, various detection signals are inputted from the operation detecting means into the controller 3, which is shown in FIG. 2, during digging work by the hydraulic excavator 1. Inputted into CPU 12 via the input unit 10 shown in FIG. 2 are, for example, a key switch signal outputted from the key switch which is actuated in response to an operation by the key for starting the hydraulic excavator 1, a regulator drive signal outputted from the regulator drive detector, an engine speed signal outputted from the engine speed sensor, a pump pressure signal outputted from the delivery pressure sensor, a pilot pressure signal outputted from the pilot pressure sensor, and a working oil temperature signal outputted from the oil temperature sensor (Arrow A in FIG. 3).

At this CPU 12, processing is performed to produce operation data (Block B in FIG. 3, Step S1 in FIG. 4). This processing for the production of the operation data is conducted, for example, on the basis of a determination standard shown in FIG. 6. Described specifically, when the key switch signal is determined to have changed from "OFF" to "ON", an operation datum "key switch ON" is produced. When the key switch signal is determined to have changed conversely from "ON" to "OFF" which stops driving of the hydraulic excavator 1, an operation datum "key switch OFF" is produced. When the regulator drive signal is determined to have changed from "OFF" to "ON", an operation datum "engine started" is produced. When the regulator drive signal is determined to have changed conversely from "ON' to "OFF", an operation datum "engine stopped" is produced. When the engine speed is determined by the engine speed signal to have increased to a predetermined engine speed or higher, an operation datum "engine started" is produced. When the engine speed is determined by the engine speed signal to have decreased conversely beyond the predetermined engine speed, an operation datum "engine stopped" is produced.

Determination of an increase in the delivery pressure of the hydraulic pump to a predetermined pressure or higher on the basis of the pump pressure signal means a state in which pressure oil has been fed to one or more of individual actuators and the corresponding one or more of unillustrated control devices for driving a boom, an arm-including front attachment, a swivel superstructure, a travel base and the like, respectively, have been operated, and an operation datum "operated" is produced. Conversely, determination of a decrease in the delivery pressure of the hydraulic pump beyond the predetermined pressure on the basis of the pump pressure signal means a state in which none of the above-mentioned, unillustrated control devices for driving the boom, the arm-including front attachment, the swivel superstructure, the travel base and the like, respectively, have been operated, and an operation datum "not operated" is produced. Further, determination of an increase in at least one of pilot pressures, which are used for change-over or the like of corresponding directional control valves, to a predetermined pressure or higher on the basis of the corresponding pilot pressure signal means a state in which the corresponding one of the above-mentioned, unillustrated control devices has been operated and the pilot pressure has been fed to the control section of the directional control valve to drive the corresponding actuator, and an operation datum "operated" is produced. Conversely, determination of a decrease in at least one of pilot pressures beyond the predetermined pressure on the basis of the corresponding pilot pressure signal means a state in which no pilot pressure is fed to the control section of the corresponding directional control valve, and an operation datum "not operated" is produced. When the temperature of the working oil flowing through the hydraulic circuit which the hydraulic excavator 1 is equipped with is determined to have arisen to a predetermined temperature or higher as a result of actuation of various hydraulic equipment, which are included in the hydraulic circuit, by the working oil temperature signal, an operation datum "oil temperature arisen" is produced. When the temperature of the working oil is determined to have dropped conversely beyond the predetermined temperature by the working oil temperature signal, an operation datum "oil temperature dropped" is produced.

Processing is next performed at CPU 12 to store the operation data, which have been produced as described above, in the memory unit 13 at intervals of a predetermined time, for example, 24 hours, that is, depending upon the day on the basis of the time outputted from the clock unit 11 shown in FIG. 2 (Arrow C and Block D in FIG. 3). Describing this processing with reference to the flow chart of FIG. 4, it is determined in Step S2 whether or not the date of operation data produced now, in other words, the date determined by a time outputted from the clock unit 11 is the same as the date of operation data produced until now. In this case, a period, for example, from 0:00 a.m. to 0:00 a.m. on the following day is defined to be 1 day, and the determination can be made on the dates determined accordingly. If the dates are the same, the operation data produced now are stored as operation data of the same day in Step S3. If the dates are different, on the other hand, the operation data produced now are stored as operation data of the following day. In this manner, individual operation data are stored separately in the memory unit 13, for example, depending upon the day.

The operation data, which have been stored separately depending upon the day in the memory unit 13 of the controller 3 as described above, are outputted from the output unit 14 in accordance with an instruction from CPU 12 at a predetermined time, for example, when a key for staring the hydraulic excavator 1 is inserted and the key switch is turned on. Processing at this time will be described based on the flow chart of FIG. 5. In Step S11, a key switch signal is firstly inputted into CPU 12 via the input unit 10 of the controller 3. At CPU 12, determination is made on the basis of the key switch signal as to whether or not the key switch has changed from "OFF" to "ON". If "NO", no particular processing is performed. If "YES", the routine returns to Step S13, and at CPU 12, processing is performed to read the operation data, which have been stored separately depending upon the day in the memory unit 13, and to output them to the satellite communication terminal equipment 2 via the output unit 2 as mentioned above.

In this case, it is designed such that the operation data of only the preceding day, for example, are outputted when the key switch is determined to have changed from "OFF" to "ON".

The operation data outputted from the output unit 14 of the controller 3 to the satellite communication terminal 2 as described above are automatically transmitted to the communication satellite 5 shown in FIG. 5, and further, from the communication satellite 5 to the earth station 6. At the earth station 6, the operation data are processed, for example, into an electronic mail format, and are transmitted to the control station 8 via the telephone line 7. By operating a personal computer which the control station 8 is equipped with, the operation data of the hydraulic excavator 1 can, therefore, be readily obtained at the place very remote from the hydraulic excavator 1. In this case, such operation data can be controlled as daily report data depending upon the "day".

According to the one embodiment of the operation data transmitting system and the one embodiment of the operation data transmitting method constructed as described above, operation conditions of the hydraulic excavator 1 can be grasped at the control station 8 located at the remote place no matter whether abnormality has occurred on the hydraulic excavator 1. By analyzing the operation data and also taking operated times of individual parts, an accumulated time of load pressures, etc. into consideration, a desired maintenance schedule can be set for the hydraulic excavator 1, and further, suitable replacement parts to be needed upon maintenance can be determined and collected ready for use. In other words, high-accuracy maintenance management of the hydraulic excavator 1 can be easily materialized without troubling its operator or a maintenance serviceman who performs a repair of the hydraulic excavator 1. Moreover, it becomes possible to develop a hydraulic excavator of superior performance by referring to the automatically-transmitted operation data as needed at the control station 8.

Figure 7:
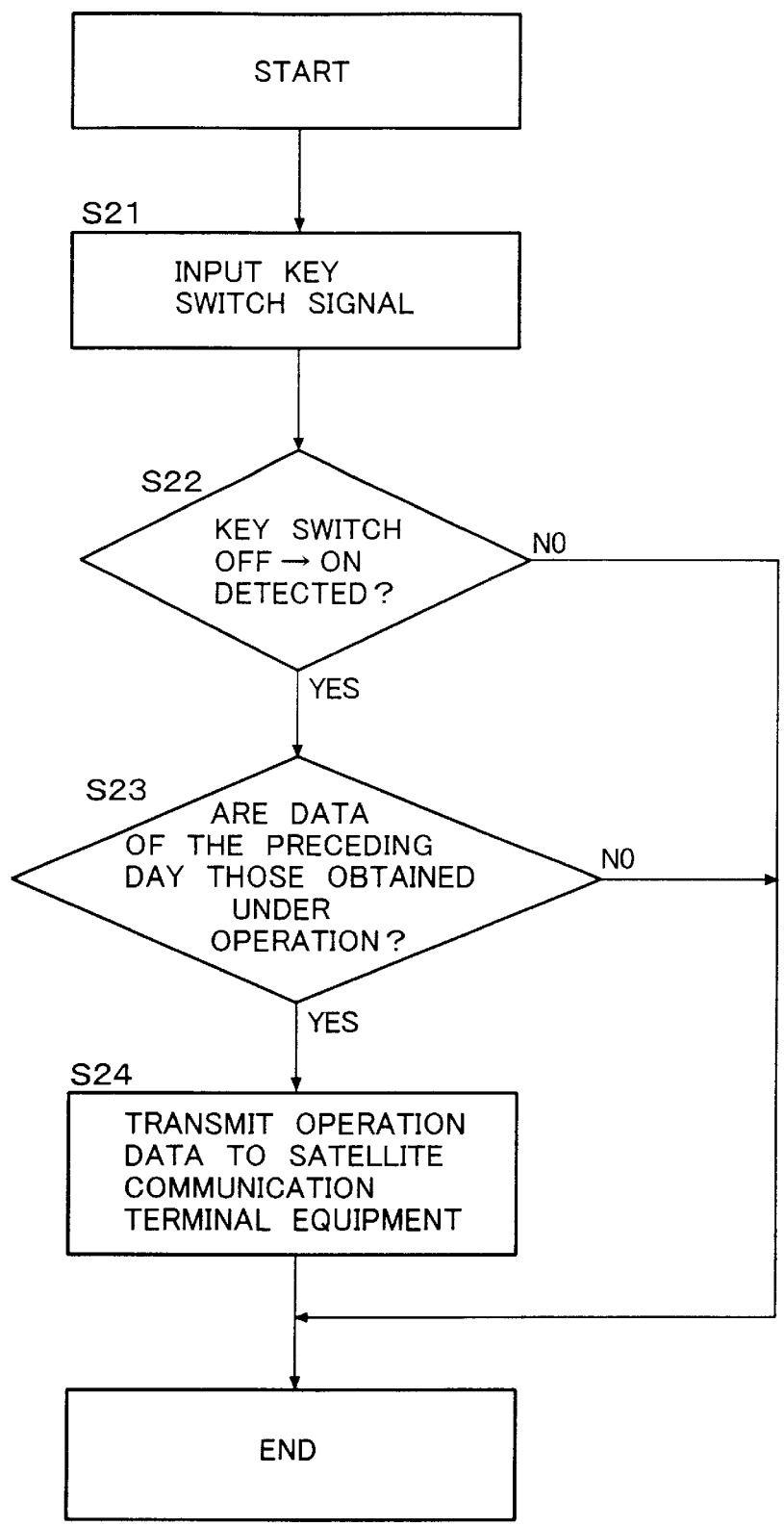
FIG. 7 is a flow chart showing a procedure for transmitting and processing operation data, said procedure making up an essential part of another embodiment of the method according to the present invention for transmitting operation data of a working machine.

FIG. 7 is the flow chart showing the procedure for transmitting and processing operation data, said procedure making up the essential part of another embodiment of the operation data transmitting method according to the present invention.

In this another embodiment, upon starting the hydraulic excavator 1, the key is inserted and a key switch signal is inputted into CPU 12 via the input unit 10 of the controller 3 (Step S21). When the key switch is determined to have changed from "OFF" to "ON" as a result of determination at CPU 21 as to whether or not the key switch has change from "OFF" to "ON" (Step S22), further determination is made as to whether or not the hydraulic excavator 1 was operated on the preceding day, in other words, whether or not the data of the preceding day are those obtained under operation (Step S23). If the data of the preceding day are not determined to be those obtained under operation of the hydraulic excavator 1, for example, are determined to solely consist of operation data such as "engine stopped" and "not operated", no transmission is performed. When the data of the preceding day are determined to be those obtained under operation, on the other hand, the routine advances to Step S24 to perform processing such that the operation data of the preceding day are transmitted to the satellite transmission terminal equipment 2 via the output unit 14.

According to the another embodiment constructed as described above, similar advantageous effects as those available from the above-described embodiment shown in FIGS. 3 to 6 can be obtained, and moreover, the number of transmissions can be reduced to bring about an economical advantage because the operation data of the preceding day are transmitted only when the hydraulic excavator 1 was operated on the preceding day.

In the above-described one embodiment of the operation data transmitting method, the predetermine time at which the operation data stored in the memory unit 13 of the controller 3 are automatically transmitted was set, for example, at the time that the key has been inserted in the keyhole of the hydraulic excavator 1 and the key switch has been turned on. The present invention is, however, not limited to this predetermined time, and the above-mentioned predetermined time can be set at a time designated beforehand. In this case, it is possible to store, for example, 0:00 a.m. as the time in the memory unit 13 and, when a time outputted from the clock unit 11 is determined by CPU 12 to have become 0:00 a.m., to output the corresponding operation data from the output unit 14.

Figure 8:
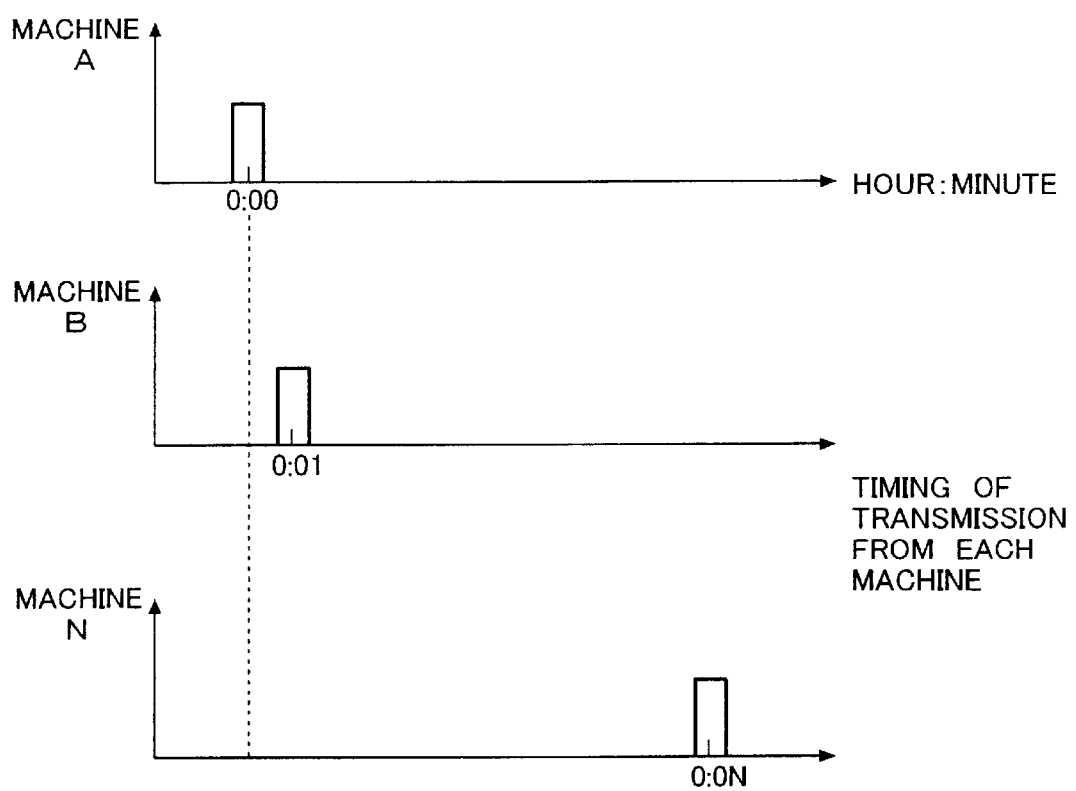
FIG. 8 is a schematic diagram illustrating a state in which operation data of plural working machines are transmitted with the timing of transmission being shifted from one working machine to another.

This embodiment is illustrated in FIG. 8. In this embodiment, times at which operation data are outputted from individual machines to CPU 12 are shifted one minute by one minute such that the operation data are outputted at 0:00 a.m. from Machine A, at 0:01 a.m. from Machine B, at 0:02 a.m. from Machine C, . . . , at 0:0N a.m. from Machine N, respectively. Owing to this setting, operation data of the preceding day are outputted successively from Machine A to Machine N at intervals of 1 minute as shown in FIG. 8. These output intervals can be set as desired, but in view of the volume of data to be transmitted, intervals similar to those in this embodiment are sufficient.

In the above-described one embodiment of the operation data transmitting method, the intervals of a predetermined time at which operation data are stored in the memory unit 13 are set to depend upon the day, that is, to be intervals of 24 hours. The present invention is, however, not limited to these intervals. The predetermined time can be set, for example, at two days, three days, one week or the like or at 6 hours, 8 hours, 12 hours or the like.

In each of the above-described embodiments, a hydraulic excavator was referred to as an example of the working machine. However, the present invention is not limited to hydraulic excavators but is also applicable to various working machines such as craned working machines.

Industrial Applicability

According to the present invention, operation conditions of a working machine can be grasped at a control station located at a remote place no matter whether or not abnormality has occurred on the working machine. This makes it possible to determine a desired maintenance schedule, and also to determine suitable replacement parts to be needed upon maintenance and to collect them ready for use. High-accuracy maintenance management of the working machine can, therefore, be readily materialized without troubling its operator or a maintenance serviceman. Further, it becomes possible to develop a working machine of superior performance by referring to the automatically-transmitted operation data as needed at the control station.

In addition, setting of the predetermined time especially at 1 day in the present invention makes it possible to control operation data of a working machine as daily report data.

Furthermore, setting suhc that operation data of a preceding day are transmitted only when a working machine was operated on the preceding day makes it possible to reduce the number of transmissions, and therefore, is economical.

What is claimed is:

1. A method for automatically transmitting operation data of plural working machines from controllers, which are arranged on said working machines, respectively, and have produced said operation data of the corresponding working machines, to a control station located at a remote place via predetermined communication means, said method comprising:

storing said operation data of said respective working machines at intervals of a predetermined time in their corresponding controllers, and automatically transmitting groups of operation data out of said operation data, said groups of operation data having been stored during desired ones or more of said intervals, from said controllers to said control station at predetermined time points shifted from one another.

2. A method according to claim 1, wherein said predetermined time is 1 day.

3. A method according to claim 2, wherein, only when said working machine was operated on a preceding day, operation data of said preceding day are transmitted.

4. A method according to claim 1, wherein said controller transmits operation data of a preceding day.

5. A method according to claim 1, wherein said working machine is a hydraulic excavator.

6. A system for transmitting operation data of plural working machines, said system being provided with operation detecting means for detecting operating conditions of said working machines, controllers for producing, as operation data, data detected by said operation detecting means, said operation detecting means and said controllers being arranged on said working machines, respectively, and a control station located at a remote place, connected with said controllers via predetermined communication means and adapted to receive operation data outputted from said controllers, wherein:

said controllers each a clock unit, a memory unit for storing said produced operation data at predetermined time intervals on a basis of a time clocked at said clock unit and an output unit for outputting at least a group of operation data out of said operation data, said group of operation data having been stored in said memory unit during desired one or more of said intervals, at a predetermined time point, and said controllers automatically transmit said operation data, which have been outputted from said output units of said controllers, to said control station with timings of transmission being shifted from one working machine to another.

7. A system according to claim 6, wherein said predetermined time point is a time stored in said memory units of said controllers.

8. A system according to claim 7, further comprising rewriting means capable of rewriting said time stored in said memory units of said controllers.

9. A system according to claim 6, wherein said predetermined communication means comprises satellite communication terminal equipment arranged on said working machine and adapted to receive said operation data outputted from said output units of said controllers, a communication satellite for receiving said operation data outputted from said satellite communication terminal equipment, and an earth station for receiving said operation data outputted from said communication satellite and outputting said operation data to said control station.

10. A system according to claim 6, wherein said predetermined communication means comprises a telephone line.

11. A system according to claim 6, wherein said predetermined communication means comprises a cellular telephone.

12. A system according to claim 6 or 9, wherein said working machine is a hydraulic excavator.

* * * * *